United States Patent [19]

Burke

[11] 3,752,922

[45] Aug. 14, 1973

[54] CRYSTAL CONTROLLED FREQUENCY SHIFT KEYING SYNCHRONOUS GENERATING SYSTEM

[75] Inventor: Nelsen W. Burke, Stoneham, Mass.

[73] Assignee: Honeywell Information Systems, Inc., Waltham, Mass.

[22] Filed: Dec. 9, 1971

[21] Appl. No.: 208,044

[52] U.S. Cl. ............ 178/66 R, 325/163, 332/16 R, 332/26

[51] Int. Cl. ............ G08c 19/14

[58] Field of Search ............ 178/66 R; 325/30, 325/163; 332/9 R, 9 T, 16 R, 16 T, 26

[56] References Cited

UNITED STATES PATENTS

| | | | |
|---|---|---|---|
| 3,614,624 | 10/1971 | Scarpino | 325/163 |
| 3,158,810 | 11/1964 | Stone | 325/163 |

*Primary Examiner*—Charles E. Atkinson
*Assistant Examiner*—R. Stephen Dildine, Jr.
*Attorney*—Faith F. Driscoll et al.

[57] ABSTRACT

An FSK transmitter includes a crystal controlled generator which includes a counter which when cycled provides a number of output signals which are logically combined to produce pulse waveforms having different repetition frequencies. The generator counter is arranged to be cycled in accordance with the state of bilevel signals applied to a plurality of input selection lines to apply pulse waveforms of the appropriate repetition frequencies to an output circuit for transmission over a communications channel. The transmitter further includes a ramp generator which is synchronized with cycling of the crystal controlled generator and which is also operative in response to the state of input selection lines to produce pulse waveforms whose repetition frequencies approximate those produced by the crystal controlled generator. During a shift in frequency, the transmitter uses the ramp generator waveforms to establish the cycle time of the counter so as to provide a nominal time period for the pulse waveforms being applied to the output circuit during the time of frequency shift thereby minimizing distortion of the waveforms at the time of crossover.

31 Claims, 6 Drawing Figures

INVENTOR
NELSON W. BURKE
BY Faith F. Driscoll
ATTORNEY

Patented Aug. 14, 1973 3,752,922

5 Sheets-Sheet 2

INVENTOR.
NELSON W. BURKE
BY
Faith F. Driscoll
ATTORNEY

INVENTOR
NELSON W. BURKE
BY Faith F. Driscoll
ATTORNEY

INVENTOR
NELSON W. BURKE
BY
Faith F. Driscoll
ATTORNEY

INVENTOR.
NELSON W. BURKE
BY
Faith F. Driscoll
ATTORNEY

CRYSTAL CONTROLLED FREQUENCY SHIFT KEYING SYNCHRONOUS GENERATING SYSTEM

BACKGROUND OF THE INVENTION

1. Field of Use

This invention relates to data transmission systems and more particularly to a modulator system for use in transmitting frequency shift keying signals. 2. Prior Art A common method of transmitting information between two data processing units over a communications channel is termed frequency shift keying (FSK). This method is one in which the information to be transmitted is converted by a modulator into audio tones whose frequency depends on the state of the information being transmitted.

When shifting from one frequency to another, FSK modulators cause phase errors and transient signals which can produce undesirable errors in the received data. More importantly, when the data signals to be transmitted are not synchronized with the modulator, considerable distortion at the time of data signal transitions corresponding to the crossover between frequencies can result.

In low speed systems wherein the data transmission rate is small relative to the lowest frequency being transmitted, the above distortions may be tolerated without significant impairment of system transmission. However, at higher speed systems wherein the data transmission rate is high relative to the lowest frequency being transmitted, these distortions affect materially the accuracy of the data transmission.

To provide accurately controlled generation of the modulating frequencies in response to information, some prior art modulators employ two crystal controlled oscillators whose frequencies are considerably higher than the fundamental frequencies. The output of one oscillator is passed through a gating network one at a time under the control of the keying information and a further network converts the higher oscillator frequency output of the gating network into the desired fundamental frequencies.

While the distortion in phase is much less, such arrangements still distort the modulating wave at the time of crossover in that the information being transmitted is not synchronized with the oscillator outputs. Hence, such prior art modulators cannot provide reliable data transmission at higher speeds. Another disadvantage of these systems is that they require a different oscillator for each frequency which makes them expensive and complex.

Other prior art suggest employing a single crystal controlled oscillator and a network for dividing the output by two different amounts for two frequencies. However, there is no particular provision for synchronizing the information with the output of the oscillator. Moreover, the number of networks and oscillators must be increased to accommodate more frequencies and larger shifts in frequencies.

Accordingly, it is an object of the present invention to provide an improved modulation system for accurately generating a plurality of frequencies.

It is a further object of the present invention to provide a FSK modulator which minimizes distortion at crossover time.

It is a more specific object of the present invention to provide an improved crystal controlled low cost modulator for generating any desired number of frequency shift keyed signals in response to information signals.

SUMMARY OF THE INVENTION

The foregoing objects are achieved in a preferred embodiment of the present invention which comprises a transmitter including a crystal controlled generator for accurately producing a plurality of frequency signals whose repetition frequencies are designated by a number of input selection signals.

The crystal controlled generator includes a crystal oscillator and counter which selectively divides the oscillator frequency by an amount corresponding to the cycle time of the counter. The selection signals are arranged to cycle the counter and establish different cycle times for the counter to produce waveforms whose repetition frequencies are related in a predetermined manner to the specific frequency signals to be transmitted.

The transmitter further includes a signal generator circuit which is operative in response to the same selection signals to produce waveforms whose repetition frequencies approximate those produced by the crystal controlled generator. The signal generator is arranged to synchronize the operation of the crystal controlled generator with the information being transmitted as specified by the selection signals. In particular, for each shift in frequency specified by changes of state in the selection signals, the signal generator waveforms are used to control the cycle time of the counter so as to provide a nominal period of time for the waveform at frequency selected. The nominal period to time established by the signal generator lies between the period of frequencies and new selected frequencies. As such, the arrangement prevents abrupt changes in the duration of the waveform at the time of transition or frequency cross-over thereby minimizing distortion of the waveform being transmitted.

Other than the time of crossover, the signal generator has its cycle time or repetition frequency established by the crystal controlled generator. By having the repetition frequency of the signal generator "slaved" to that of the crystal controlled generator, the transmitter is accurately synchronized to the information signals.

In the preferred embodiment, the signal generator is a R-C ramp generator which includes a plurality of switching transistor circuits and associated resistors which condition the ramp generator to produce waveforms used to produce the frequencies specified. The utilization of the R-C generator minimizes the complexity of the transmitter.

In the illustrated embodiment, the waveforms of different repetition frequencies produced by the counter are applied to a converter circuit. The circuit converts the waveforms into square wave waveforms whose repetition frequencies correspond to the frequencies selected. The square wave waveforms are thereafter converted into sinusoidal waveforms by a low pass filter network for application to the communications channel Since the square wave waveforms will be of a nominal duration at the time of frequency crossover, the sinusoidal waveforms produced by the network will be distortion free.

The above and other objects of this invention are achieved in an illustrative embodiment described hereinafter. Novel features which are believed to be characteristic of the invention both as to its organization and method of operation, together with further objects and advantages thereof will be better understood from the following description considered in connection with the accompanying drawings. It is to be expressly understood, however, that these drawings are for the purpose of illustration and description only and are not intended as a definition of the limits of the present invention.

DESCRIPTION OF THE PREFERRED EMBODIMENT

Figure 1:
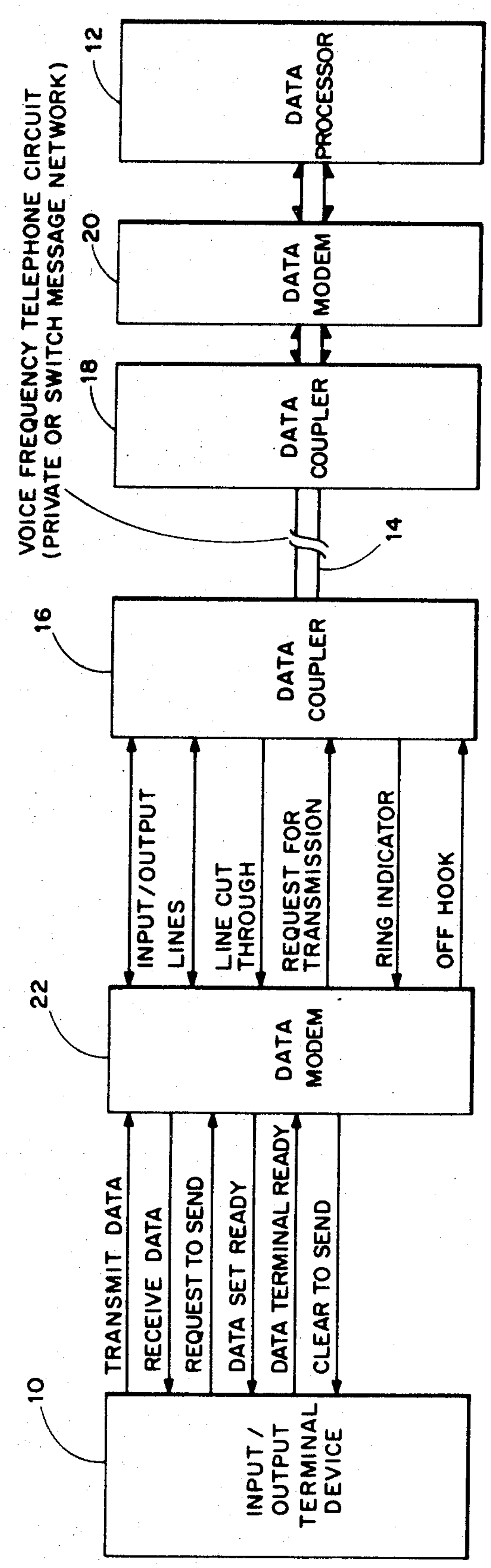
FIG. 1 shows in block diagram form a system incorporating the present invention.

FIG. 1 shows, in block diagram form, a data communications system for transmitting information between two data processing devices 10 and 12 via a communications channel 14 and data couplers 16 and 18 associated with data modems 20 and 22.

The data processing devices 10 and 12 may be any input or output terminal device or any processor operative to transmit and receive digital information signals. For example, the terminal device 10 may take the form of a data terminal station which preprocesses data for transmission to a remote located data processor 12. As shown, communication between the two devices proceeds through dta couplers 16 and 18 in a conventional manner via telephone lines 14 connected to either a private or switch message network.

The left side of FIG. 1 illustrates the pertinent interface lines between the data modem 22 and the data coupler 16 in addition to those lines between the modem 22 and device 10. The same interface arrangement can be also assumed to connect the units shown at the right side of FIG. 1.

The data coupler 16 is conventional in design and may take the form of one of the couplers described in a publication titled "Bell System Data Communications Technical Reference — Data Couplers CBS and CBT for Automatic Terminals" published by the American Telephone and Telegraph Company dated August, 1970. It will be appreciated that the interface lines designated in FIG. 1 will change as a function of the access arrangement chosen and therefore the arrangement disclosed should in no way be regarded as limiting with respect to the subject invention. The functions of the interface lines shown will be described hereinafter in greater detail in connection with the description given for system operation with specific reference made to FIG. 3*b*.

Figure 2A:
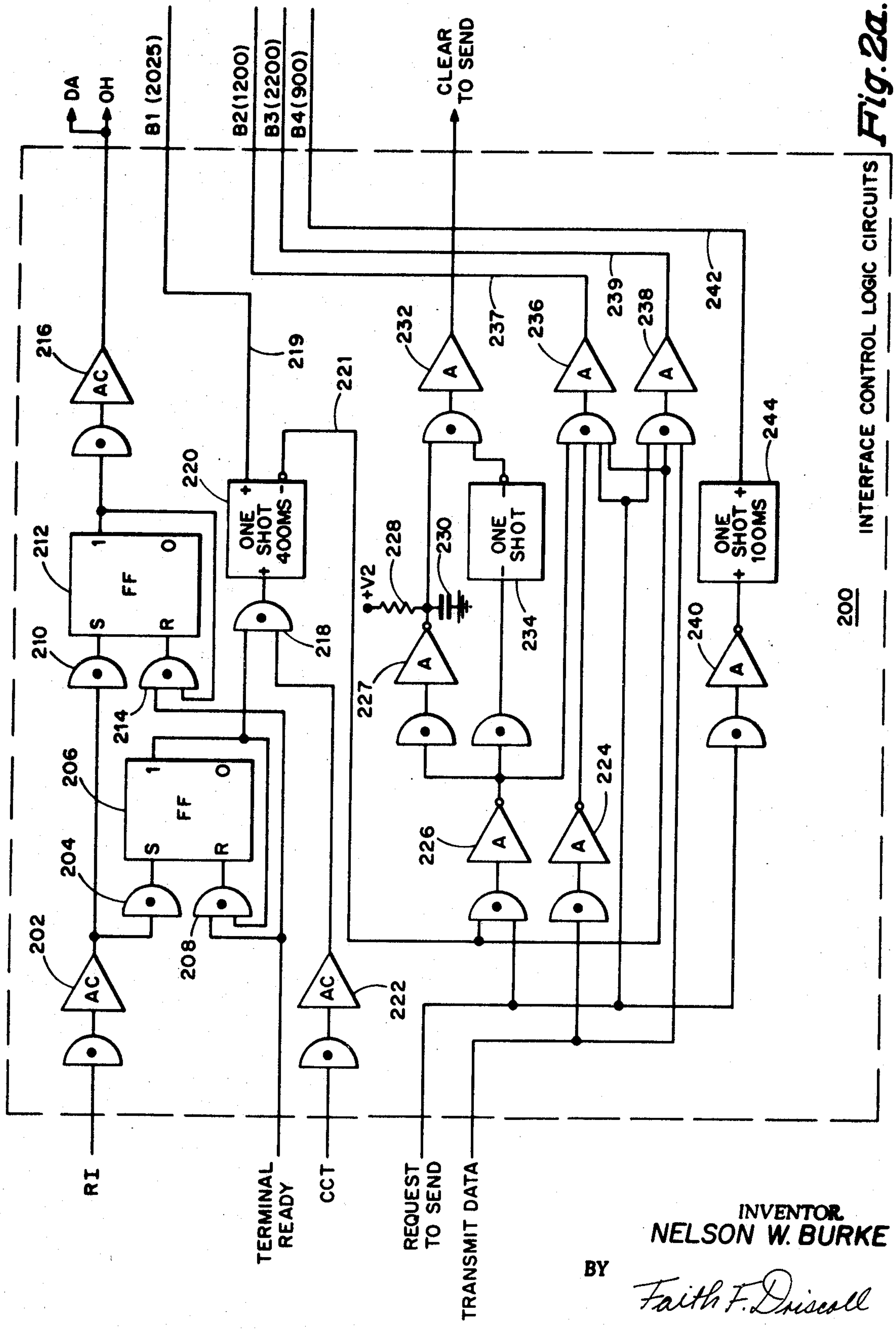
FIG. 2*a* shows in greater detail the control section of the data modem of FIG. 1.
Figure 2B:
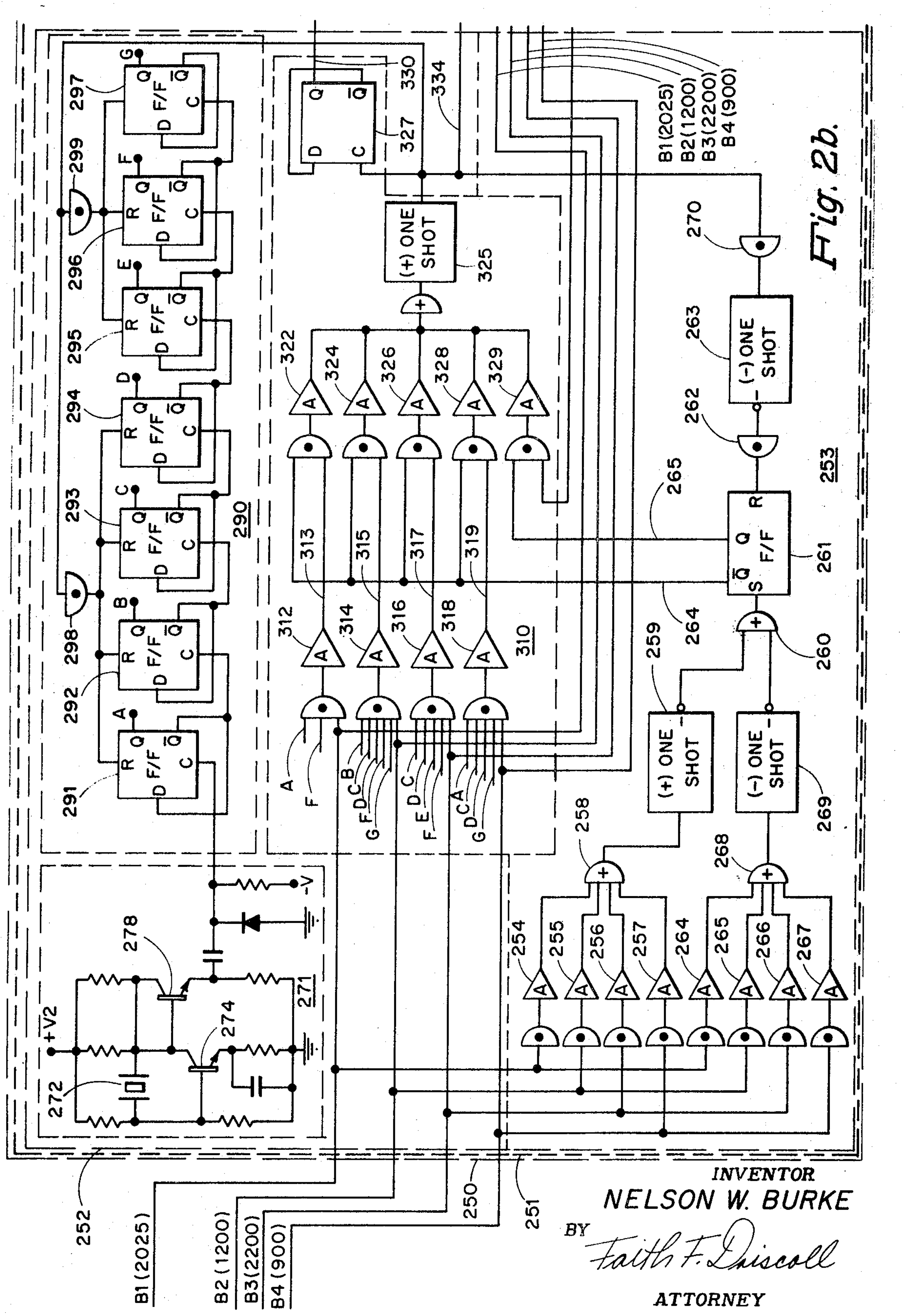
FIGS. 2*b* and 2*c* show in greater detail the generator section of the data modem of FIG. 1.
Figure 2C:
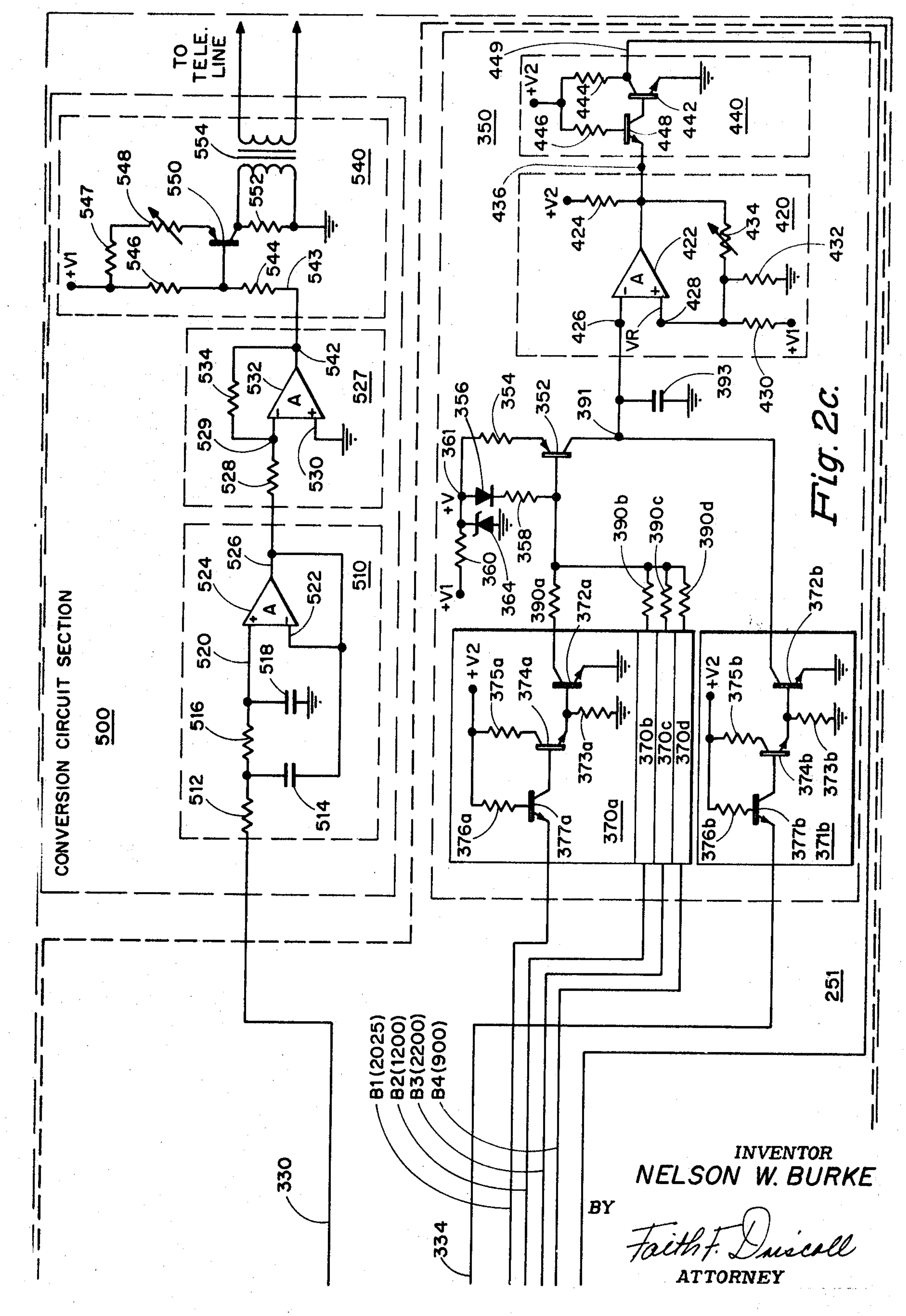

Referring to FIGS. 2*a*, 2*b* and 2*c*, it will be noted that the pertinent control logic circuits and transmitter portion of the data modem 22 of FIG. 1 are disclosed in greater detail within blocks 200 and 250 respectively.

The logic circuits of block 200 include driver circuits 202 and 222 which convert the normally bipolar voltage levels applied to a pair of lines RI and CCT to suitable logic voltage levels utilized by the internal logic circuits illustrated. Conversely, the driver circuit 216 converts the logic voltage levels generated by the internal logic circuits into bipolar voltage levels suitable for utilization by the data coupler 16 and these levels are applied to a line DA and a line OH.

The above described driver circuits are conventional in design and may take the form of level shifting circuits disclosed in the text titled "Pulse and Switching Circuits " by Milliman and Taub, McGraw Hill Book Company, Inc., Copyright 1965.

The converter circuit 202 feeds a first of flip-flops 206 and 212 via AND gates 204 and 210. The converter circuit 222 feeds a one-shot circuit 220. The one-shot circuit 220 is conventional in design and may for example take the form of the retriggerable monostable multivibrator circuit described in the publication titled "9601 Retriggerable Monostable Multivibrator" published by Fairchild Semiconductor Inc., Copyright 1968. The one-shot circuit 220 when triggered via an input AND gate 218, applied complementary output signals to lines 219 and 221. The line 219 is applied as a first selection input to the transmitter Section 250 and the line 221 is applied as an inhibiting input to a pair of combination AND gates and amplifier circuits 236 and 238.

The complement or inversion of the output signal applied to line 219 is indicated by the circle at line 221. Similarly, the circles at the output terminals of amplifier circuits 224 and 226 in FIG. 2 are also used to indicate that these circuits invert the input signals applied thereto.

A control signal level representative of a binary ONE when applied to a TERMINAL READY line by the input terminal device (e.g. data processor, etc.) enables the setting of flip-flops 206 and 212 respectively via hold gates 208 and 214 and thereby places the data modem 22 in a ready state for processing a call. That is, each of the flip-flops 206 and 212 is arranged to have its binary ONE output connected back via its input gate to a hold or recirculation input labeled R which allows a binary ONE on line RI to switch the flip-flop to a binary ONE by applying a holding signal thereto only when the TERMINAL READY line is a binary ONE. Each of the flip-flops is reset to a binary ZERO upon removal of the holding signal applied to each of the inputs R when the TERMINAL READY line is forced to a binary ZERO.

Subsequent to forcing the DATA TERMINAL READY line to a binary ONE, the terminal device 10 when it has data ready to transmit signals the data modem 22 by applying a control signal to a REQUEST TO SEND line. This line is coupled as an input to an AND gate and inverter circuit 226 whose output is coupled jointly to the input of a gate and inverter circuit 227 and to the input of a one-shot circuit 234. The output of inverter circuit 227 connects in series with a delay circuit which includes a resistor 228 and a capacitor 230 connected to a supply voltage +V2 as shown. The inverter 227, in this arrangement, is assumed to take the form of the inverter circuits shown in blocks 370*a* and 371*b*. As such, the inverter 227 has an open collector output stage which has resistor 228 as its collector load resistor. The output of the delay circuit (i.e., junction formed by resistor 228 and capacitor 230) and the inverted or complement output of one-shot 234 are applied as inputs to an AND gate and amplifier circuit 232 whose output couples to a line designated CLEAR TO SEND. Additionally, the control signal applied to the REQUEST TO SEND line is also applied to a gate inverter circuit 240 and AND gate amplifier circuits 236 and 238. The output of inverter circuit 240 connects as an input to a one-shot circuit 244. The output of the one-shot circuit 244 is applied to the Transmitter Section 250 via line 242.

The data modem 22 when ready to accept data for transmission applies a control signal to the CLEAR TO SEND line which is returned to the terminal device 10 and initiates transmission of data signals to a TRANSMIT DATA line.

The assertions of the data signal levels representative of binary ONE and ZERO data generated by the terminal device 10 are applied via the TRANSMIT DATA line to the AND gate and amplifier circuit 238 and then to the Transmitter Section 250 via line 239 when the AND gate 238 is enabled by appropriate signal levels from the REQUEST TO SEND line and line 221. The inversions of data signal levels produced by a gate inverter circuit 224 are applied to an AND gate and amplifier circuit 236. These signal levels are thereafter applied to the Transmitter Section 250 via a line 237 when the AND gate 236 is enabled by signal levels from the REQUEST TO SEND line and line 221.

The Transmitter Section 250 of the data modem 22 comprises a generator section 251 and a conversion circuit section 500.

The generator section 251, as shown, includes a crystal controlled pulse generator 252, a ramp generator 350, and a frequency shift control circuit 253. In greater detail, the crystal controlled pulse generator 252 includes a crystal controlled oscillator 271, a counter 290, and a frequency selection gating network 310. The crystal controlled oscillator 270 includes a crystal 272, a pair of transistors 274 and 278 connected in the arrangement shown which in the preferred embodiment produce pulses having a frequency of 264 kilohertz.

The counter 290, as shown, includes a plurality of flip-flops 291 through 297 connected in series to operate as a binary ripple counter. It is assumed that each flip-flop triggers on the leading edge of a pulse applied to its clock input C. Each such input C of flip-flops 292 through 297 are driven by the $\overline{Q}$ output of a previous stage to produce as increasing binary count. The binary counter 290 is arranged to have all of its flip-flops reset to their binary ZERO states by way of reset gates 298 and 299.

The ramp generator 350, as shown, includes a transistor current source with a number of input circuits for conditioning the current source to supply one of a number of different values of current to charge a capacitive storage element 393 linearly to produce a ramp of voltage. The generator 350 further includes an output circuit for providing a path for discharging the capacitive storage element 393.

In greater detail, the transistor current source contains a PNP transistor 352 having its emitter electrode connected in series with an emitter resistor 354 to a supply voltage +V1 through a resistor 360. A series biasing voltage network including a diode 356 and a resistor 358 also connects the base electrode of transistor 352 to one end of the resistor 360 to form a junction 361. A zener diode 364 is arranged to maintain the junction 361 at a constant voltage +V.

The current source input circuits include a plurality of transistor transistor logic (TTL) gate inverter circuits **370*a* through 370*d* which connect in parallel respectively through resistors 390*a* through 390*d* to the input circuit of current source transistor 352 via its base electrode. The output circuit connects in series with the output circuit of the current source transistor 352 via its collector electrode and includes a TTL gate inverter circuit 371*b* operative to connect capacitor 393** to ground.

In FIG. 2, all of the gate inverter circuits **370*a* through 370*d* may be identical in construction. In particular, each input circuit thereof may include a single input gate transistor circuit 377*a* which feeds a phase splitter transistor 374*a* which drives a further inverter transistor 372*a*. The transistor 372*a* of each circuit has its collector-emitter path connected in series with one of the resistors 390*a* through 390*d*. The single output circuit 371*b* has its collector-emitter path connected in series with capacitor 393.**

In the foregoing arrangement, the gating circuits **370*a* through 370*d* operate as switches for selectively connecting the resistors 390*a* through 390*d* respectively to a reference voltage potential illustrated as ground in FIG. 2. The gating circuit 371*b* operates as a switch to connect the capacitor 393** to ground.

The generator section 350 further includes a level detector circuit 420 which connects to the junction 391. This circuit is arranged to have a near zero hysteresis characteristic and may, for example, include a Schmitt trigger circuit implemented using a single amplifier 422, conventional in design, connected in a feedback arrangement shown. The circuit 422 may take the form of such circuits as those described in a publication titled "LM111/LM 211 Voltage Comparator" by National Semiconductor Corporation, Copyright 1970.

As shown in FIG. **2*c*, the amplifier 422 has a non-inverting input terminal 428 and an inverting input terminal 426. The input terminal 428 connects to an output terminal 436 of amplifier 422 via a voltage divider network which includes fixed resistors 430 and 432, and a feedback variable resistor 434 connected as shown. It will be noted that the amplifier 422 drives a load resistor 424 which has one end connected to resistor 434 and the other end connected to source of supply voltage, +V2. The inverting input terminal 436 connects to the junction 391.**

The circuit 420 is operative in accordance with the voltage level applied to terminal 426 to apply a bilevel output signal level to output terminal 436 which connects as an input to another TTL gate inverter circuit 440. The feedback arrangement of the amplifier ensures that the amplifier rapidly switches the state of the signal level applied to terminal 426. The inverter circuit 440 which includes a pair of transistors 448 and 442 and a pair of resistors 446 and 444 is operative to invert the bilevel signal level at terminal 436 and apply the complement of the signal level to the Frequency Selection Circuit 310 via an output line 449.

As shown, the Frequency Selection Circuits 310 include two sets of logic gating circuits, a one-shot circuit 325 and a complementing flip-flop 327. In greater detail, one set of logic circuits includes a plurality of AND gating circuits 312, 314, 316 and 318. Each AND gating circuit receives as one input, a different one of the frequency selection levels B1 through B4 together with predetermined outputs from the various stages of counter 290. The predetermined outputs of the counter selected represent a count and, as such, establish the repetition frequency or rate at which pulses are applied by a selected AND gate to a corresponding one of the output lines 313, 315, 317 and 319 connected therewith. As explained herein, the count selected provides pulses whose frequency are twice or double the desired frequency.

The outputs of each of the AND circuits 312, 314, 316 and 318 are applied along lines 313, 315, 317 and 319 respectively to a second set of logic gating circuits. These gating circuits include a plurality of AND gating circuits 322, 324, 326, 328 and 329. Each of the AND gating circuits 322, 324, 326 and 328 received the pulses from a different one of the lines 313, 315, 317 and 319 together with a first control signal applied via line 264. The AND gating circuit 329 receives a signal from the ramp generator 350 along line 449 and a second control signal from line 265. The outputs of each of the AND gates of the second set of logic gating circuits are "ORed" together and applied to an input gate circuit of the one-shot circuit 325. The one-shot circuit 325 triggers on a positive going transition to produce an output pulse of short duration (i.e., well within the cycle time of counter 290) on a line 334.

The output pulses producd by one-shot circuit 325 serve two important functions. Since the frequency of these pulses establishes the frequency to be transmitted, they are first applied to a CLOCK input, C, of the complementing flip-flop 327 which converts each of the pulses into a symmetrical square wave in addition to dividing the frequency of the pulses by two to establish a square wave whose frequency corresponds to the frequency selected. The square wave is in turn applied along line 330 to Conversion Section 500.

The flip-flop 327, as shown, is a conventional D-type flip-flop connected in a complementing arrangement. Additionally, each of the pulses from one-shot circuit 325 are used to provide a reset pulse signal for the counter 290 and ramp generator 350 thereby establishing the cycle time for both. Since the reset pulse signal is derived primarily from the crystal oscillator 271 and counter 290, the repetition frequency of the ramp generator 350 is accurately maintained within tolerances established by the crystal controlled oscillator. Lastly, the above-mentioned pulses provide reset signals for a control flip-flop 261 included within the Frequency Control Circuits 253 now to be described.

FREQUENCY CONTROL CIRCUITS

In addition to control flip-flop 261, the Frequency Control circuits include a plurality of pairs of gate buffer circuits 254 – 264 and 257 – 267 which have their inputs connected to receive a different one of the selection levels B1 through B4. The outputs of the gate buffer circuits 254 through 257 are ORed together by a gate 258 and applied to one-shot circuit 259, arranged, as shown, to trigger on positive going transitions. In a similar fashion, the outputs of the gate buffer circuits 264 through 267 are "ORed" together by a gate 268 and applied to a one-shot circuit 269 arranged, as shown, to trigger on negative going transitions. The complement or inversion output of each of the one-shot circuits 259 and 269 are ORed by a further gate 260 and applied to a set input of set-reset control flip-flop 261. The complement outputs are used since it is assumed that flip-flop 261 triggers on negative going transitions.

The flip-flop 261 is arranged to be switched to its binary ZERO or reset state via a gate 262 upon receiving the complement output from a one-shot circuit 263 which is arranged to be triggered on a negative going edge of the reset signal produced by one-shot circuit 325 applied thereto via a gate 270. It will be appreciated that the one-shot circuit 263 also produces pulses of short duration (i.e. well within the cycle time of counter 290). The binary ONE and binary ZERO outputs disignated as Q and $\overline{Q}$ of flip-flop 261 are applied to lines 265 and 264 respectively.

CONVERSION CIRCUIT SECTION

The Conversion Circuit Section 500 converts the square wave applied to line 330 into a sinusoidal waveform which it then amplifies and applies to the line via an output driver circuit. As shown, the Section 500 includes a two pole active low pass filter 510, an amplifier stage 527 and output driver stage 540.

The active low pass filter 510 converts the square wave pulses into a sinusoidal waveform and rejects signals higher than the highest frequency to be transmitted. The filter, conventional in design, includes an amplifier 524, with its output terminal 526 connected to its inverting amplifier terminal 522. The terminal 522 connects to one end of a capacitor 514 which forms part of the RC network which further includes resistors 512 and 516 and a capacitor 518 arranged as shown. For further details regarding the operation of low pass active filters, reference may be made to the article titled "Part 2-Active Bandpass Filters" by Thomas Molinga EEE Circuit Design Engineering, August 1966.

The sinusoidal waveform at terminal 526 is applied to the inverting terminal of amplifier 532 through a series resistor 528. The inverting terminal connects to the output terminal 542 of the amplifier 532 through a feedback resistor 534 and the noninverting terminal 530 connects to a reference voltage illustrated as ground.

The amplifier 532 applies an amplified sinusoidal waveform via an output terminal 542 as an input to current driver output circuit 540. As shown, the driver circuit 540 includes a PNP transistor 550 which couples via the data coupler 16, not shown, to the telephone line through a transformer 554. More particularly, the collector electrode of transistor 550 directly connects to the primary of transformer 554 which is shunted by a line termination resistor 552. The emitter electrode of transistor 550 connects through a variable resistor 548 and a fixed resistor 547 to the supply voltage +V1. The base electrode of transistor 550 connects to the supply voltage +V1 and to the terminal 542 respectively through a resistor 546 and a resistor 544.

OPERATION OF TRANSMITTER SECTION 250

In general, the state of the signal levels B1 through B4 applied to input lines 219, 237, 239 and 242 respectively condition the crystal controlled generator 252 to enable a particular one of the AND logic gating circuits 312, 314, 316 and 318 of FIG. **2*b* to pass pulses whose repetition frequency is twice the frequency selected. Additionally, the same levels B1 through B4 selectively enable the ramp generator 350** to produce a ramp waveform whose frequency is also twice the frequency of the frequency selected.

In greater detail, the operation of the transmitter Section 250 will be described with reference to FIG. 3*a*. It is assumed that initially a signal level B3 applied to line 239 is a binary ONE (i.e., positive voltage +V2) and the remaining signal levels B1, B2 and B4 are binary ZEROS. At this time, AND gate 316 is enabled to pass an output pulse to line 317 each time the counter outputs C, D, E and F are binary ONES. That is, each time the counter 290 counts to 60, gate 316 passes an output pulse. Since it is assumed that flip-flop 261 is in its binary ZERO state, line 264 is a binary ONE which enables AND gate 326 to pass the output pulse on line 317 to one-shot circuit 325.

Figure 3A:
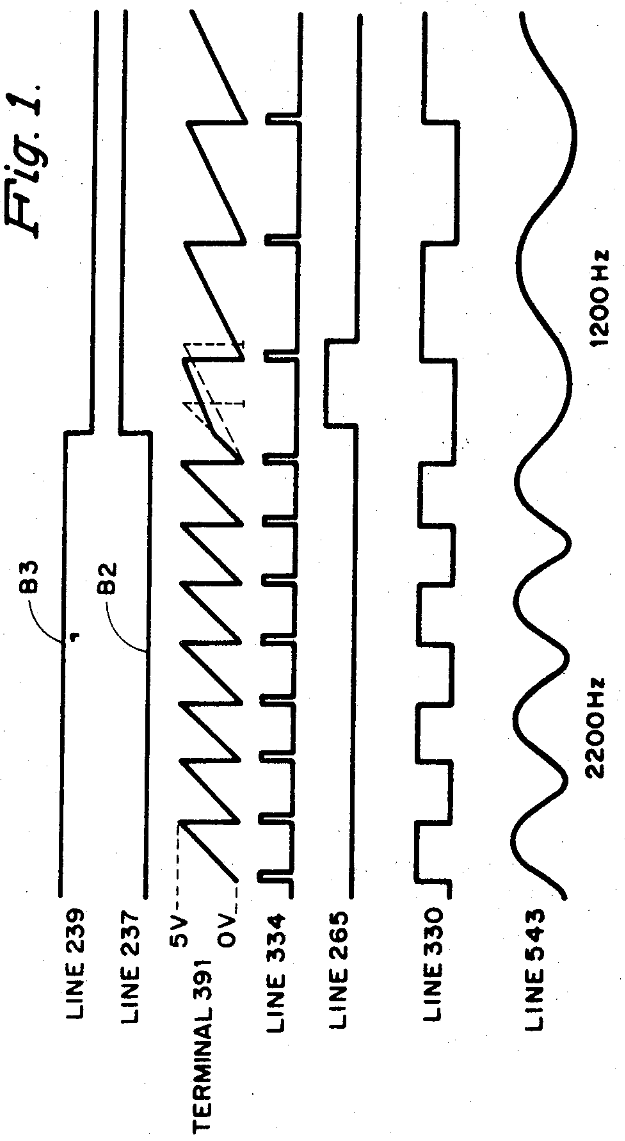
FIG. 3*a* shows waveforms useful in describing the operation of the Transmitter Section of FIG. 2.

From FIG. 3*a*, it will be noted that signal level B3 also conditions gate inverter circuit 370*c* to switch its output transistor 372*a* on which in turn connects resistor 390*c* to ground. This causes a predetermined voltage level to be applied to the base electrode of transistor 352 causing it to charge capacitor 393 at a predetermined rate producing the ramp waveform at terminal 391 as illustrated by FIG. 3*a*.

Initially, comparator amplifier 422 is in a binary ONE state and the resistors 430 and 434 establish an upper voltage level for reference voltage VR which can be adjusted to insure proper switching of comparator amplifier 422 (i.e. produce an output) where it is desired that all of the ramp waveforms be of approximately the same amplitude as shown in FIG. 3*a*. By adjusting the reference voltage, the repetition frequency of the ramp generator can be more accurately synchronized to the frequency of the generator 252.

Each time capacitor 393 is permitted to charge to the positive level, VR, comparator amplifier 422 switches from its initial binary ONE state to a binary ZERO state which forces terminal 428 to a second voltage level, established by resistors 430, 432, and 434. This causes inverter stage 440 to render transistor 442 non-conductive which forces line 449 from a binary ZERO to a binary ONE state. Thus, the comparator amplifier 422 converts the ramp waveform into a rectangular waveform which is inverted and applied to line 449. However, since flip-flop 261 is in a binary ZERO state, a change in state in line 449 has no effect on AND gate 329 as its operation is inhibited by the binary ZERO applied to line 265. From this, it is seen that the value selected for reference voltage VR need not be accurately established. Accordingly, only the positive going edge of the pulse applied via gate 326 by the generator 252 triggers one-shot circuit 325 causing it, in turn, to produce a reset pulse of short duration (e.g., 1 usec) to line 334. The pulse resets the stages of counter 290 to all ZEROS in addition to establishing the start of the retrace time for the ramp voltage developed by generator 350. More specifically, the reset pulse conditions inverter 371*b* to switch its output transistor 372*b* on which provides a rapid discharge path for capacitor 393. When the capacitor 393 discharges to a predetermined voltage (i.e., the second voltage level), the comparator amplifier 422 is allowed to switch back to its original state. Since comparator amplifier 422 has not switched state (i.e., the ramp voltage has not reached the reference voltage before the occurrence of the reset pulse), it remains in a binary ONE state.

It will be appreciated that so long as there is no change of state in signal levels B1 through B4, the counter 290 at every count of 60 produces a pulse which triggers one-shot circuit 325 producing a reset pulse. This pulse is used to reset both the counter 290 and the generator 350 to their initial states. Accordingly, the particular count selected establishes the rate at which pulses are produced and this rate corresponds to the cycle time of counter 290 and the period of the ramp waveform.

The rate in each instance corresponds to twice the frequency being selected. The desired frequency is obtained by applying the pulses to the complementing flip-flop 327 which converts the pulses into a symmetrical square wave of the desired repetition frequency as illustrated at line 330 in FIG. 3a. The square wave is in turn converted into a sinusoidal waveform by the active low pass filter 510, amplified by amplifier 527 and applied to the line by driver 540.

As illustrated in FIG. 3a, the above described operation continues until another frequency is selected at which time levels B2 and B3 respectively are forced to a binary ONE and to a binary ZERO. The positive going and negative going transitions produced by the change of state in levels B2 and B3 cause one-shot circuits 259 and 269 to produce pulses which switch control flip-flop 261 from its binary ZERO state to a binary ONE state. At this time, the flip-flop 261 forces line 265 to a binary ONE as illustrated by FIG. 3d. Conversely, line 264 is forced to a binary ZERO.

By the above action, control flip-flop 261 inhibits the passage of pulses through AND gates 322, 324, 326 and 328, thereby permitting the ramp generator to continue charging until it reaches the reference voltage, VR, at which time comparator amplifier 422 switches from a binary ONE state to a binary ZERO state. At this time, line 449 is forced from a binary ZERO state to a binary ONE state. The AND gate 329 preconditioned by a binary ONE on line 265 is operative to pass the change in state occurring on line 449 to one-shot circuit 325 causing it to produce a reset pulse on line 334.

In the manner previously described, both the counter 290 and the generator 350 are reset to their initial states. At the negative going edge of the reset pulse, one-shot circuit 263 triggers and produces a pulse which causes control flip-flip 261 to be switched from its binary ONE to its binary ZERO state as illustrated by FIG. 3*a*. This in effect transfers "reset control" of the counter 290 of generator 252 from the ramp generator 350 back to the crystal controlled generator 252.

From FIG. 3*a*, it will be noted that the complementing flip-flop 327 during the transition time or time of frequency crossover is conditioned to switch state only in response to a reset pulse provided by the ramp generator 350. Since the period of the ramp voltage closely approximates the cycle time of the counter 290, the square wave produced by flip-flop 327 in response to the reset pulse is of the desired duration. That is, the ramp generator 350 produces a reset pulse which falls between the time occurrence of pulses for the previous and new selected frequencies. As such, the square wave produced is not abruptly shortened and is of a duration at least greater than the shorter of the two frequencies. The foregoing is illustrated by the two ramp waveforms shown in dotted lines in FIG. 3a which represent the time durations of the previous and new frequencies. Accordingly, the sinusoidal waveform derived from this square wave has no distortion at the time of crossover between frequencies. Hence, notwithstanding changes in the frequencies, the resultant square wave will always produce a sine wave with no crossover distortion.

The values of resistors and other components of the ramp generator 350 for the frequencies required in the system of FIG. 1 are given in the table herein to follow. These values are given for the purpose of illustration only and should be in no way be construed as a limitation of the present invention.

TABLE

| RESISTORS | VALUES IN KILOHMS |
|---|---|
| 354,432 | 1 |
| 358 | 0.620 |
| 390a | 2.74 |
| 390b | 4.87 |
| 390c | 2.43 |
| 390d | 6.15 |
| 430 | 1.5 |
| 434 | 5 |
| CAPACITORS | VALUE IN MICROFARADS |
| 393 | 0.47 |
| SUPPLY VOLTAGES | VALUE IN VOLTS |
| +V | 9.8 |
| +V1 | 15 |
| +V2 | 4.3 |

SYSTEM OPERATION

With reference to FIGS. 1, 2*a*, 2*b*, 2*c* and 3*b*, the operation of the data modem 22 of FIG. 1 will now be described. It is assumed for the purpose of this example that the called location including the input/output terminal device 10 is going to transmit information to the data processor 12. In accordance with conventional procedures, the data processor 12 initiates the dialing of the terminal device location through an automatic calling unit which in turn causes the generation of a ringing signal through conventional telephone apparatus, not shown.

Figure 3B:
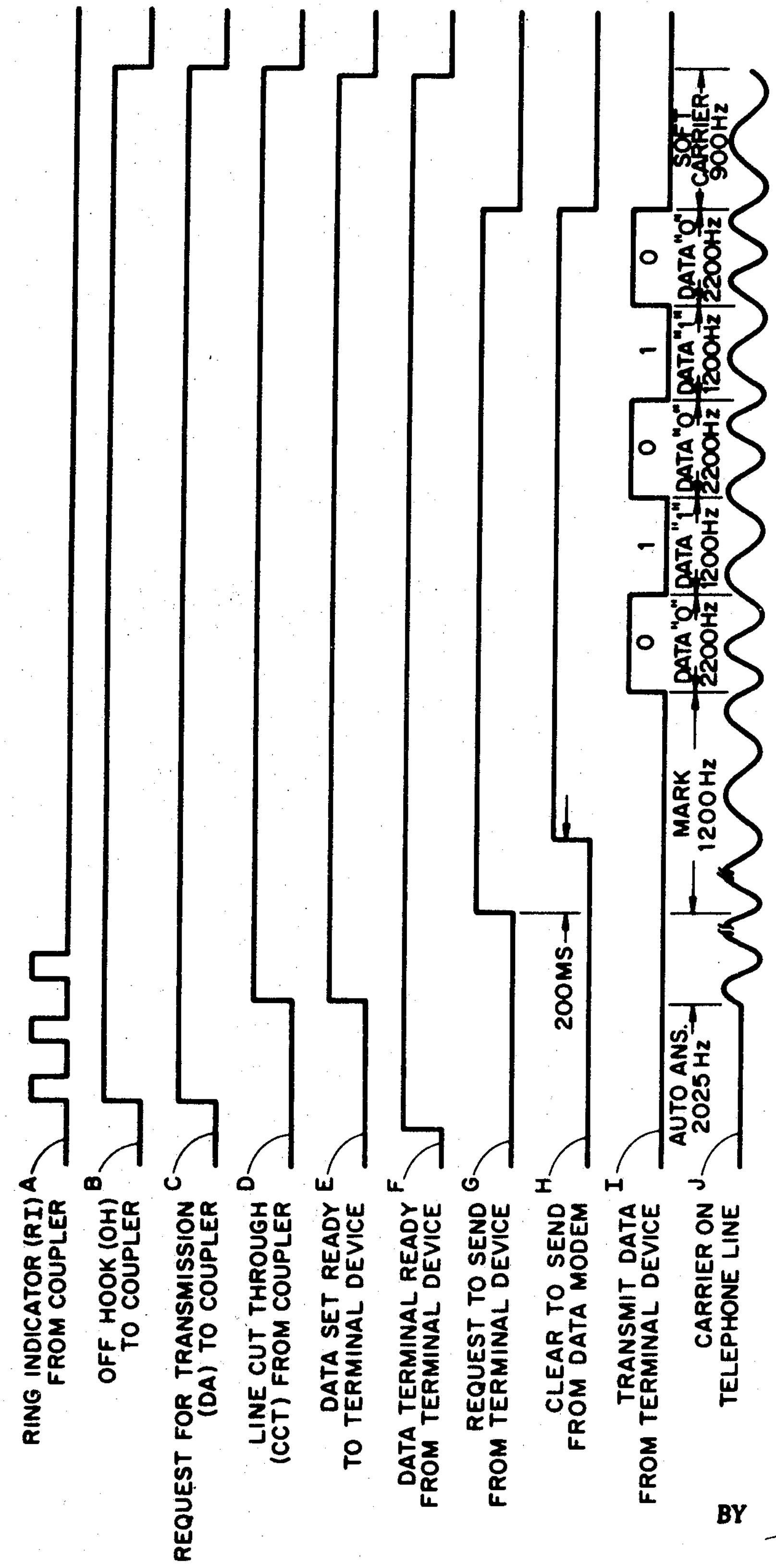
FIG. 3*b* shows waveforms useful in describing the operation of the system of FIG. 1.

In data coupler 16 in response to the aforementioned ringing signal indicates the receipt of the call of the data modem 22 which includes logic circuits for answering the call. Specifically, the data coupler 16 detects the incoming ring signal and applies a series of positive going signals to ring indicator line RI. The signals are illustrated in FIG. 3*b* as a series of pulses which correspond to waveform A. Normally, the ring signal is turned on for a period of 1.7 seconds once every 6 seconds (i.e., once for each ring).

The positive going signal applied to the line RI is shifted in level by a level converter circuit 202. This signal together with a binary ONE holding signal provided by the TERMINAL READY line, in turn causes flip-flops 206 and 212 to be switched to their binary ONE states. The flip-flop 212 foices the line OH' to a binary ONE in turn causing level converter circuit 216 to force the line OH and the REQUEST FOR TRANSMISSION line DA to a binary ONE which permits the answering of the call. That is, line OH is forced to a binary ONE signaling notification of the call and at that time the DA line is also forced to a binary ONE, signaling the coupler 16 to request a data transmission path to a local telephone channel. The above changes in line signal levels are illustrated by waveforms B and C of FIG. 3*b*.

When a transmission path is connected through the coupler 16 to the local telephone line, the data coupler 16 signals the modem 22 that data transmission may begin by forcing line CCT to a binary ONE.

Following the establishment of the connection, in the manner described above, the data modem 22 transmits a tone of a first frequency of 2,025 hertz for a predetermined period of time (i.e., approximately 400 milliseconds) sufficient to disable the echo suppressors and answer the call initiated by the automatic calling unit of the data processor 12. In greater detail, when the line CCT is forced to a binary ONE generating waveform D of FIG. 3*b*, AND gate 218 is enabled which triggers one-shot circuit 220. At that time, the level B1 applied to line 219 is forced to a binary ONE which preconditions AND gate 312 and enables circuit 370*a* to switch resistor 390*a* into the input circuit of current transistor 352. This conditions the ramp generator 350 to produce a ramp waveform having a pulse rate of 4,050 pulses per second herein referred to as having a frequency of 4,050 hertz. The ramp waveform is converted into a rectangualr wave by the switching of comparator amplifier circuit 420.

The change of state of signal level B1 is applied via circuit 254 and triggers one-shot circuit 259 which in turn switches control flip-flop 261 to its binary ONE state. Accordingly, the Frequency Control Circuits 253 permit the generator 350 to provide a first reset pulse for both the counter 290 and generator 350 and the first pulse for switching the state of complementing flip-flop 327. The same reset pulse triggers one-shot circuit 263 which resets control flip-flop 261 to its binary ZERO state. As long as flip-flop 261 remains in its binary ZERO state, the control circuits 253 permit the crystal controlled generator 252 to provide subsequent pulses at a repetition frequency of 4050 hertz for resetting both generators and for switching the state of complementing flip-flop 327. That is, the crystal controlled generator 252 is operative to enable AND gate 312 each time the counter 290 advances to a count of 65, thereby producing pulses at a frequency of 4,050 hertz. The complementing flip-flop 327 converts these pulses into symmetrical square waves whose frequency corresponds to the selected frequency of 2,025 hertz. The low pass filter 510 converts the square wave waveform applied to line 330 into the sinusoidal waveform I of FIG. 3*b* and this waveform is applied to the telephone circuit line 14.

When the automatic calling unit or coupler 18 of FIG. 1 detects the 2,025 hertz tone from the sending station, it in turn switches the telephone line over to the control of the data modem of the data processor 12.

Referring to FIG. 2*a*, it will be noted that the complement of the signal level B1 applied to line 219 is applied via line 221 to gate inverter circuit 226 which "ANDs" the waveform with the waveform G of FIG. 3*b*. Since the terminal device normally forces its REQUEST TO SEND line to a binary ONE as soon as it is ready to send data, the complement of the waveform applied to line 221 inhibits the gates 236 and 238 from responding to the state of the TRANSMIT DATA line until data modem 20 has signaled an answer to the call (i.e., generated the 2,025 hertz answer tone). Accordingly, the state of the REQUEST TO SEND line is permitted to enable either of gates 236 and 238 at the trailing edge of the pulse generated by the one-shot circuit 220. Also at this time, gate 226 triggers one-shot circuit 234 and after a predetermined delay (i.e., when a data modem 22 is in condition to accept data for transmission), AND gate 232 forces the CLEAR TO SEND line to a binary ONE signaling the terminal device 10 that it can transmit data. This places the terminal device in the transmit mode.

During the time interval following the generation of the answer tone when the REQUEST TO SEND line is a binary one, and before CLEAR TO SEND line is switched to a binary ONE, the data modem 22 forces signal level B2 high, switching line 237 to a binary ONE. This conditions the crystal controlled generator 252 and ramp generator 351 to provide pulses having a frequency of 2,400 hertz which flip-flop 327 converts into a frequency of 1,200 hertz. This frequency corresponds to the system "marking" frequency.

Considering the above in greater detail, the Frequency Control Circuits 253 in the manner described above, permit the first pulse to be provided by generaotr 350 and subsequent pulses to be provided by the crystal controlled generator 252. More particularly, the level B2 preconditions AND gate 314 and enables inverter circuit **370*b* to switch resistor 390*b* into the input circuit of transistor 352. This conditions the ramp generator 350 to produce a ramp waveform having a frequency of 2,400 hertz which is used to provide a first reset pulse. Thereafter, the crystal controlled generator 252 is operative to enable AND gate 314 each time the counter 290 advances to a count of 110 thereby producing pulses at a frequency of 2,400 hertz. Thus, the state of complementing flip-flop 327 switches first in response to the pulse provided by generator 350 and thereafter in response to pulses provided by the crystal controlled generator 252.**

The generation of the marking frequency signals the data processor 12 that data transmission is beginning. More specifically, the normally 200 millisecond time delay interval established by one-shot circuit 234 permits line reflections caused by previous transmissions to decay and allows time for the receiving data modem carrier detection circuits (not shown) to sense the incoming signal.

Upon receipt of the CLEAR TO SEND signal from modem 22, the terminal device 10 is operative to generate timing signals, by means not shown, for applying data signals corresponding to waveform I to the TRANSMIT DATA terminal. When the signal applied to the TRANSMIT DATA terminal is a ONE, it forces level B2 applied to line 237 to be forced to a ONE. When the signal applied to the TRANSMIT DATA terminal is a binary ZERO, it forces level B3 applied line 239 to a binary ONE. Accordingly, the generator 251 in response to lines 237 and 239 being forced to ONEs is operative to generate pulses having frequencies of 1,200 hertz (mark frequency) and 2,200 hertz (space frequency) respectively as illustrated by waveform I in FIG. 3*b*. In greater detail, the signal level B2 preconditions AND gate 314 and enable inverter circuit **370*b* to switch resistor 390*b* into the input circuit of transistor 352, and the signal level B3 preconditions AND gate 316 and enables inverter circuit 370*c* to switch resistor 390*c* into the input circuit of transistor 352. This action conditions the generator 350** to produce ramp waveforms having repetition frequencies of either 2,400 hertz or 4,400 hertz.

As previously described, the Control Circuits 253 permit the generator 350 to provide the first pulse in response to the change of state in signal levels B2 and B3. It will be appreciated that counter 290 of generator 252 could also provide the first pulse where the transition produced by level B2 and B3 coincide with the particular count selected in which instance both generators may provide coincident pulses. After the first pulse, in the case of signal level B2, the crystal controlled generator 252 enables AND gate 314 each time the counter 290 advances to a count of 110. As concerns signal level B3, the crystal controlled generator 252 enables AND gate 316 each time the counter 290 advances to a count of 60. The pulses produced by one-shot circuit 325 are converted by complementing flip-flop 327 into symmetrical square waves having frequencies of 1,200 and 2,200 hertz.

When the terminal device 10 has completed its data transmission to the processor 12, as normally signaled to the processor 12 by the transmission of a special control character (i.e., an end of text ETX or end of transmission (EOT) character), it forces the REQUEST TO SEND line to a binary ZERO state which signals the end of transmission to the data modem 22. The REQUEST TO SEND line when forced to a binary ZERO state inhibits further data transmission via gates 236 and 238.

To avoid the possibility of generating line transients by abruptly terminating transmission which could produce errors in the data received by the data processor 12, the data modem 22 is operative to provide a "soft carrier turn-off" wherein the carrier is shifted downward in frequency toward a predetermined out of data band frequency corresponding to 900 hertz as illustrated in FIG. 3*b*. In greater detail, when the REQUEST TO SEND line goes to a binary ZERO, it in turn forces gate 240 to a ONE which triggers the 100 milliseconds one-shot circuit 244. This forces the level B4 applied to line 242 to a binary ONE which preconditions AND gate 318 and gate **370*d* to switch resistor 390*d* into the input circuit of transistor 252. The generator 350 is operative to produce a ramp waveform having a frequency of 1,800 hertz, and the crystal controlled generator 252 is operative to produce pulses at a rate of 1,800 hertz by enabling AND gate 318 each time counter 290** advances to a count of 141.

In the manner described above, the Frequency Control Circuits 253 permit generator 350 to provide a first pulse and the crystal controlled generator 252 to provide subsequent pulses. These pulses are applied to complementing flip-flop 327 which in turn produces a square wave waveform having a frequency of 900 hertz which endures for the period of time corresponding to the width of the pulse produced by the one-shot circuit 244 (i.e., 100 milliseconds).

Normally, the receiver portion of the data processor's 12 data modem 20 is operative to sense the shift in frequency and cause its RECEIVE DATA line to be clamped to a predetermined state (i.e. mark state) thereby terminating transmission. If the terminal desires release of the telephone line, it forces the TERMINAL READY line to a binary ZERO which in turn switches flip-flops 206 and 216 to their binary ZERO states. This causes the lines DA and OH to be forced low, signaling the data coupler to disconnect the terminal device from the line.

From the foregoing description, it will be apparent that the invention provides an improved frequency shift keying transmitter which is suitable for both synchronous and asynchronous operation. The system enables synchronous transmission of the different frequencies at high rates without distortion at the time of transition time of crossover between frequencies notwithstanding variations in the asynchronously applied external data signals. That is, the transmitter prevents changes in the external data signals signaling a crossover between frequencies from causing abrupt changes in the output waveform which would produce distortion in the signal to be transmitted. For increased accuracy for high speed data transmission, the transmitter is synchronized with a crystal controlled source.

Additionally, the transmitter has the advantages of simplicity of construction and low cost as it obviates the need for having more than a single crystal controlled oscillator and maximizes the use of common logic circuits for each of the frequencies required to be transmitted.

It will be appreciated by those skilled that many changes may be made to the illustrated embodiment without departing from the spirit and scope of the invention. For example, although certain types of circuits such as ramp generator circuit has been disclosed, it will be understood that other types of generator circuits may also be utilized.

Further, in some instances, certain circuits may be eliminated. For example, certain portions of the conversion circuits may be omitted so as to utilize the communications channel for extraction of the sinusoidal signals from the generated square wave signals.

While in accordance with the provisions and statutes there has been illustrated and described the best form of the invention known, certain changes may be made to the circuits described without departing from the spirit of the invention as set forth in the appended claims and that in some cases certain features of the invention may be used to advantage without a corresponding use of other features.

Having described the invention, what is claimed as new and novel and for which it is desired to secure Letters Patent is:

1. A transmitter for generating frequency shift keying signals for application to a communications channel in response to digital information signals applied to said transmitter by an input device, said transmitter comprising:

first crystal controlled generating means including input circuit means coupled to said input device and output circuit means, said first generating means being arranged to produce output pulse signals of predetermined repetition frequencies at said output circuit means for application to said channel in response to said digital information signals applied to said input circuit means;

second generating means coupled to said input device and being arranged to produce output pulse signals whose repetition frequencies approximate said predetermined repetition frequencies; and, frequency selection and control means coupled to said first and second generating means and being operative in response to a change in state of said digital information signals signifying a shift in frequency to condition said first generator means so as to substitute selectively pulse signals produced by said second generating means.

2. The transmitter according to claim 1 further including:

control logic means coupled to receive said digital information signals from said input device, said control logic means including means for generating a plurality of bilevel selection signals in response to said digital information signals and means for applying said selection signals jointly to said input means of said first generating means, and to said second generating means, said first and second generating means being operative to produce said output pulse signals whose repetition frequencies are established in accordance with the states of said bilevel selection signals.

3. The transmitter of claim 1 further including means coupling said output circuit means of said first crystal controlled generating means to said second generating means for conditioning said second generating means to produce said output pulse signals in synchronism with said pulse signals produced by said first generating means.

4. The transmitter of claim 3 further including frequency divider means coupled to said output circuit means of said first crystal controlled generating means for receiving said output pulse signals, said divider means being operative to produce a square wave pulse whose repetition frequency is a submultiple of the repetition frequency of said output pulse signal; and, conversion means coupled to said divider means and to said channel, said conversion means being operative in response to said square wave pulses to produce a sine wave whose frequency corresponds to the frequency selected.

5. The transmitter of claim 4 wherein said frequency divider means includes bistable complementing means arranged to produce said square wave pulses whose repetition frequency is one-half of said repetition frequency of said output pulse signals.

6. The transmitter of claim 5 wherein said conversion means includes active low pass filter means coupled to said complementing means and being operative to extract said sine wave from said square wave pulses.

7. A frequency shift keying transmitter for generating at least two frequencies for application to a communications channel in response to bilevel selection signals applied to a plurality of input selection lines, said transmitter comprising:

first generating means coupled to said selection lines and arranged to produce output pulse signals of predetermined repetition frequencies in response to said bilevel selection signals;

second generating means having a plurality of input terminals and an output terminal, said input terminals being connected to said input selection lines and said second generating means being operative in response to each of said bilevel selection signals to produce an output pulse signal at said output terminal whose repetition frequencies approximate said predetermined repetition frequencies; and, frequency selection and control means coupled to said first and second generator means and being operative in response to changes in state of said selection signals signifying a shift from a prior selected repetition frequency to a new selected repetition frequency to condition said first generator means so as to selectively substitute pulse signals from said second generating means for said pulse signals produced by said first generating means in accordance with said new selected repetition frequency in a manner so as to minimize crossover distortion of said frequencies of said output pulse signals during each change in state in said selection signals.

8. The transmitter of claim 7 wherein said first generating means is crystal controlled and said output terminal of said first generating means is coupled to said second generating means for conditioning said second generating means to produce pulse signals in synchronism with the output pulse signals produced by said first generating means.

9. The transmitter according to claim 8 wherein said first generating means includes;

a crystal controlled oscillator means arranged to produce pulses of a single repetition frequency;

binary counter means coupled to said oscillator means and being operative in response to said pulses to be incremented through successive counts; and, logic means having a plurality of input terminals and an output terminal, predetermined ones of said input terminals being coupled to a different one of said selection lines and other ones of said input terminals being coupled to said counter means in a manner so as to apply to said output terminal pulse signals of a predetermined repetition rate established by different counts of said counter means selected in accordance with said status of said selection signals; and, said logic means being coupled to said frequency selection and control means and being conditioned by said control means in response to said changes in the states of said selection signals to inhibit selectively the application to said output terminal of pulse signals derived from counts of said counter means and to pass pulse signals from said second generating means.

10. The transmitter according to claim 9 wherein said second generating means includes:

ramp generating means having a plurality of input terminals and an output terminal, one of said input terminals being coupled to the output terminal of said logic means and each of the other of said input terminals being coupled to a different one of said selection lines, said ramp generating means being operative in response to each of said bilevel selection signals to produce a ramp voltage waveform of a predetermined repetition frequency; and, comparator amplifier switching means having an input terminal directly coupled to said output terminal of said ramp generating means and an output terminal coupled to said frequency selection and control means, said switching means being operative in response to a predetermined voltage level of said ramp waveform to produce a rectangular waveform of a frequency equal to the selected repetition frequency of said ramp voltage waveform.

11. The transmitter according to claim 10 wherein said ramp generating means includes:

a transistor current source having an input circuit and an output circuit;

a plurality of gating means, each of said gating means having an input terminal and an output terminal, said input terminal being coupled to a predetermined one of said input terminals;

a plurality of resistor means, each of said resistor means being coupled to said input circuit in series with the output terminal of a different one of said gating means and each being arranged to apply a predetermined voltage level to said input circuit upon the activation of said gating means to condition said transistor current source to supply a predetermined amount of current;

capacitor storage means coupled to said transistor output circuit for producing a linear ramp voltage waveform whose repetition frequency is determined by the selection of said gating and resistor means in accordance with the state of said bilevel selection signal; and, amplifier switching means coupled to said capacitor storage means and being operative to generate said first set of pulse signals at said output terminal in response to predetermined voltage levels of said voltage waveform.

12. The transmitter according to claim 11 wherein each of said gating means including a transistor inverter circuit having base, emitter, and collector electrodes, said base electrode being coupled to said input terminal for receiving said selection signal, said emitter electrode being coupled to ground potential and said collector electrode being coupled to said output terminal whereby said inverter circuit is operative in response to said selection signal to couple said resistor means associated therewith to said ground potential so as to apply said predetermined voltage level.

13. The transmitter according to claim 9 wherein said frequency selection and control means includes:

an input section, said input section including a plurality of gating means coupled to said input selection lines and coupled to said counter means, each of said gating means being arranged to combine selectively signals from said counter means representative of said counts with a different one of said selection signals to produce said pulse signals of a predetermined repetition frequency;

an output section coupled to said input section and to said output terminal for selectively applying said output pulse signals, said output section including pulse reset means coupled to said counter means and to said one input terminal of said ramp generating means, said pulse reset means being operative in response to each of said output pulse signals to force said counter means and said ramp generating means to an initial state; and, bistable control means coupled to said selection lines, said bistable control means being operative to produce a first control signal when switched to a first state in response to a change in state in any one of said selection signals and being operative to produce a second control signal when switched to a second state by said pulse reset means;

said output section being conditioned by said second control signal to cause said reset means to produce a reset pulse in response to pulse signals from said comparator switching means for resetting said counter means to said initial state so as to have the repetition frequency of said output pulse signals established by the counts of said counter means as specified by said selection signals, said output section being operative in response to said first control signal to condition said pulse reset means to reset said counter means in response to said pulse signals from said second generating means so as to have the period of each of said output pulse signals during said changes of state established by said second generating means within the limits of said prior selected frequency and said new selected frequency as specified by said selection signals thereby minimizing said crossover distortion of said output pulse signals.

14. The transmitter according to claim 13 wherein each of said gating means of said input section includes:

an AND gate having a plurality of input terminals and an output terminal, said input terminals connected to receive said different one of said input selection lines and selected output signals and said AND gate being operative to produce an output pulse signal whose frequency corresponds to the cycle time of said counter means in accordance with a predetermined count defined by said output signals; and, wherein said output section includes:

a plurality of AND gates, each number of said AND gates having a pair of input terminals and an output terminal, one of said input terminals of a number of each of said gates being connected to a different one of said input section AND gate output terminals and the other one of said input terminals of each of said gates being coupled to said bistable control means to receive said first control signal and one input terminal of one of said plurality being connected to said output terminal of said ramp generating means and the other input terminal of said gate being coupled to said bistable control means to receive said second control signal, said output section, being operative to pass selectively output pulse signals through one of said plurality of AND gates from a selected one of said one of said plurality in accordance with the state of said first and second control signals.

15. The transmitter of claim 13 further including:

frequency divider means coupled to said pulse reset means of said output section for receiving said output signal, said divider means being operative to produce an output square wave waveform which is a submultiple of the fundamental frequency of said output signal; and, conversion means coupled to said divider means and to said channel, said conversion means being operative in response to said square wave waveform to provide a sinusoidal waveform of the frequency selected.

16. The transmitter of claim 15 wherein said frequency divider means includes bistable complementing means arranged to produce said square wave pulses whose repetition frequency is one-half of said repetition frequency of said output pulse signals.

17. The transmitter of claim 15 wherein said pulse reset means includes:

first pulse generating means having an input terminal and an output terminal, said input terminal being connected to the output terminals of each of said AND gates of said output section;

said first pulse generating means being operative to produce a first pulse in response to the leading edge of a pulse from said counter means for switching said ramp generator means to said initial state for switching the state of said complementing means; and, second pulse generating means being operative at the termination of said first pulse to generate a second pulse for switching said bistable control means to said second state.

18. The transmitter of claim 17 wherein said first and second pulse generating means are one-shot circuits adapted to produce pulses whose widths are selected to be much smaller than the period of said ramp generating means.

19. A transmitter for producing frequency shift keying signals in response to an input binary information signal comprising:

a stable pulse generator operative to produce pulse signals of a predetermined repetition frequency;

a counter coupled to said generator and being arranged to count said generator pulse signals;

selectively operable means coupled to said counter for resetting said counter to an initial state when said counter advances to different predetermined counts so as to provide output signals at the respective rates of said resetting of said counter;

generating means for selectively generating pulse signals at variable rates corresponding to said frequencies of said output signals provided by said counter;

an output terminal;

first logic means coupled to said selectively operable means and being conditioned by said binary information signal normally to pass to said output terminal said output signals of said counter; and, second logic means being coupled to said operable means and being responsive to a change of state in said binary signal to condition said operable means to change the frequency of said output signals of said counter, said second logic means being further coupled to said first logic means and to said generating means for disabling said first logic means and for applying said output pulse signals of said generating means to said output terminal in response to said change of state in said binary signal.

20. A transmitter for generating at least two frequencies for application to a communications channel in response to bilevel selection signals applied to a plurality of input selection lines, said transmitter comprising:

crystal controlled oscillator means arranged to produce an output signal of a single fundamental frequency;

counter means including a plurality of series connected bistable means, a first one of said bistable means being coupled to said oscillator means for receiving said output signal, each bistable means being operative to produce an output signal whose frequency is a different submultiple of said single frequency;

ramp generating means having a plurality of input terminals and an output terminal, said input terminals being connected to said input selection lines and said ramp generating means being operative in response to each of said bilevel signals to produce a first set of pulse signals at said output terminal of a different predetermined fundamental frequency; and, frequency selection and control means including:

an input section, said input section including a plurality of gating means coupled to said input selection lines and coupled to said plurality of bistable means, each of said gating means being arranged to selectively combine output signals of predetermined ones of said series of bistable means with a different one of said selection signals to produce a second set of pulse signals of a predetermined fundamental frequency for application to an output terminal specified by said selection signals;

an output section coupled to said input section and to said ramp output terminal for selectively applying as an output signal said first and second sets of pulse signals, said output section including pulse reset means coupled to said counter means, said pulse reset means being operative in response to said output signals to produce a reset signal to force said counter means to an initial state; and, bistable control means coupled to said input terminals and being operative to produce a first control signal when switched to a first state in response to a change in state in any one of said bilevel selection signals, said bistable means being coupled to said output means and being operative to produce a second control signal when switched to a second state by said pulse reset means;

said output section being conditioned by said second control signal to condition said reset means to reset said counter means in response to said second set of pulse signals so as to have the repetition frequency of said output signal established only by the cycling rate of said counter means as specified in accordance with the state of said input selection signals and said second set of pulse signals, said output section being operative in response to said first control signal to condition said pulse reset means to reset said counter means in response to said first set of pulse signals to have the period of said output signal within limits established by said fundamental frequencies of said ramp generating means selected in accordance with said change of state in said bilevel selection signals thereby providing an output signal of nominal duration during the crossover time when shifting between frequencies.

21. The transmitter of claim 20 wherein said ramp generating means is coupled to said pulse reset means and is adapted to be reset to an initial state by said reset means so as to produce said first set of pulse signals in synchronism with said second sets of pulse signals produced by said counter means.

22. The transmitter of claim 20 further including:

frequency divider means coupled to said output section for receiving said output signal, said divider means being operative to produce an output square wave waveform which is a submultiple of the fundamental frequency of said output signal; and, conversion means coupled to said divider means and to said channel, said conversion means being operative in response to said square wave waveform to provide a sinusoidal waveform of the frequency selected.

23. The transmitter of claim 22 wherein said conversion means includes active low pass filter means coupled to said complementing means and being operative to discriminate against all frequencies higher than the highest frequency to be transmitted by said transmitter.

24. The transmitter of claim 23 wherein said complementing means includes a D-type flip-flop connected to complement.

25. The transmitter according to claim 20 wherein each of said gating means of said input section includes:

an AND gate having a plurality of input terminals and an output terminal, said input terminals connected to receive said different one of said input selection lines and selected output signals and said AND gate being operative to produce an output pulse signal whose frequency corresponds to the cycle time of said counter means in accordance with a predetermined count defined by said output signals; and wherein said output section includes:

a plurality of AND gates, each of a number of said AND gates having a pair of input terminals and an output terminal, one of said input terminals of a number of each of said gates being connected to a different one of said input section AND gate output terminals and the other one of said input terminals of each of said gates being coupled to said bistable control means to receive said first control signal and one input terminal of one of said plurality being connected to said output terminal of said ramp generating means and the other input terminal of said gate being coupled to said bistable control means to receive said second control signal, said output section being operative to selectively pass output pulse signals through one of said plurality of AND gates from a selected one of said input AND gates and said one of said plurality in accordance with the state of said first and second control signals.

26. The transmitter according to claim 25 wherein said bistable control means includes:

a flip-flop having a set input and a reset input;

first pulse generating means having an input terminal and an output terminal, said input terminal being coupled to said input selection lines and said output terminal being coupled to said set input of said flip-flop;

second pulse generating means having an input terminal and an output terminal, said input terminal being coupled to said input selection lines and said output terminal being coupled to said set input of said flip-flop; and, third pulse generating means having an input terminal and an output terminal, said input terminal being coupled to said pulse reset means and said output terminal being coupled to said reset input of said flip-flop, said first pulse generating means and second pulse generating means respectively being operative to produce an output pulse in response to positive and negative going transitions of said bilevel selection signals for switching said flip-flop to said first state and said third pulse generating means being operative to switch said flip-flop to said second state in response to said reset signal from said pulse reset means.

27. The transmitter of claim 26 wherein said pulse reset means includes:

first pulse generating means having an input terminal and an output terminal, said input terminal being connected to the output terminals of each of said AND gates of said output section;

said first pulse generating means being operative to produce a first pulse in response to the leading edge of a pulse from said counter means for switching said ramp generator means to said initial state and for switching the state of said complementing means; and, second pulse generating means being operative at the termination of said first pulse to generate a second pulse for switching said flip-flop to said second state.

28. The transmitter of claim 27 wherein said first and second pulse generating means are one-shot circuits adapted to produce pulses whose widths are selected to be much smaller than the period of the waveforms produced by said ramp generating means.

29. The transmitter of claim 20 wherein said ramp generating means includes:

a transistor current source having an input circuit and an output circuit;

a plurality of gating means, each of said gating means having an input terminal and an output terminal, said input terminal being coupled to a predetermined one of said input terminals;

a plurality of resistor means, each being coupled to said input circuit in series with the output terminal of a different one of said gating means and each being arranged to apply a predetermined voltage level to said input circuit upon the activation of said gating means to condition said transistor current source to supply a predetermined amount of current;

capacitor storage means coupled to said transistor output circuit for producing a linear ramp voltage waveform whose repetition frequency is determined by the selection of said gating and resistor means in accordance with the state of said bilevel selection signals; and, amplifier switching means coupled to said capacitor storage means and being operative to generate said first set of pulse signals at said output terminal in response to predeternined voltage levels of said voltage waveform.

30. The transmitter according to claim 29 wherein each of said gating means includes a transistor inverter circuit having base, emitter, and collector electrodes, said base electrode being coupled to said input terminal for receiving said selection signal, said emitter electrode being coupled to ground potential and said collector electrode being coupled to said output terminal whereby said inverter circuit is operative in response to said selection signal to couple said resistor means associated therewith to ground so as to apply said predetermined voltage level.

31. A data modem for transmitting FSK signals to a communication channel in response to binary information signals applied from an input device, said modem comprising:

control logic means coupled to said input device and being operative in response to said binary information signals to generate at least first and second bilevel selection signals;

first generating means including:

crystal controlled oscillator means for generating pulses of a predetermined repetition rate; and, frequency divider means including a plurality of series coupled bistable means, a first of said bistable means being coupled to said oscillator means to receive said pulses;

logic gating and control means having a plurality of input terminals being coupled to receive a different one of said selection signals and being coupled to predetermined ones of said bistable means for receiving pulse signals representative of different predetermined counts, said output terminal being coupled to said each of said bistable means of said divider means and said logic gating and control means being conditioned in accordance with said selection signals to pass pulse signals representative of one of said predetermined counts to said output terminal conditioning said divider means to produce subsequent pulse signals of said one of said predetermined counts corresponding to a predetermined repetition frequency; and, second generating means having a plurality of input terminals and an output terminal, each of said input terminals being coupled to receive a different one of said selection signals and said output terminal being coupled to said logic gating means, said second generating means being operative when conditioned by one of said selection signals to generate pulse signals at a predetermined repetition rate approximating the rate of the pulse signals produced by said selected count and said logic gating and said control means being conditioned by said selection signals during a shift from a prior frequency to a new frequency to selectively substitute pulse signals produced by said second generating means for said pulse signals produced by said count in a manner so as to establish durations for said pulse signals applied to said output terminal no shorter than the shorter of the two frequencies designated during each shift in frequency.

* * * * *

UNITED STATES PATENT OFFICE

CERTIFICATE OF CORRECTION

Patent No. 3,752,922 Dated August 14, 1973

Inventor(s) Nelson W. Burke

It is certified that error appears in the above-identified patent and that said Letters Patent are hereby corrected as shown below:

Inventor's Name: change "Nelsen" to --Nelson--.

Column 14, line 13, change "ETX" to --(ETX)

Column 19, line 58, after "state", insert --and--.

Signed and sealed this 26th day of February 1974.

(SEAL)
Attest:

EDWARD M.FLETCHER,JR.
Attesting Officer

C. MARSHALL DANN
Commissioner of Patents